(12) United States Patent
Hanson

(10) Patent No.: US 6,549,852 B2
(45) Date of Patent: Apr. 15, 2003

(54) METHODS AND SYSTEMS FOR MANAGING FARMLAND

(75) Inventor: Glenn P. Hanson, Jamestown, ND (US)

(73) Assignee: MZB Technologies, LLC, Jamestown, ND (US)

( * ) Notice: Subject to any disclaimer, the term of this patent is extended or adjusted under 35 U.S.C. 154(b) by 0 days.

(21) Appl. No.: 09/904,580

(22) Filed: Jul. 13, 2001

(65) Prior Publication Data

US 2003/0018431 A1 Jan. 23, 2003

(51) Int. Cl.[7] ............................................. G06F 7/00
(52) U.S. Cl. ..................................... 702/2; 705/4
(58) Field of Search .......................... 702/5, 2; 700/283; 701/50; 705/4; 324/347; 111/130; 239/1

(56) References Cited

U.S. PATENT DOCUMENTS

| | | | |
|---|---|---|---|
| 4,630,773 A | 12/1986 | Ortlip | 239/1 |
| 5,220,876 A | 6/1993 | Monson et al. | 111/130 |
| RE35,100 E | 11/1995 | Monson et al. | 111/130 |
| 5,841,282 A | 11/1998 | Christy et al. | 324/347 |
| 5,897,619 A | 4/1999 | Hargrove, Jr. et al. | 705/4 |
| 5,995,894 A | 11/1999 | Wendt | 701/50 |
| 6,236,907 B1 * | 5/2001 | Hauwiller et al. | 700/283 |
| 6,236,924 B1 * | 5/2001 | Motz et al. | 701/50 |
| 6,401,041 B1 * | 6/2002 | Petersen | 702/5 |

OTHER PUBLICATIONS

Declaration of Glenn P. Hanson dated Nov. 8, 2001.

\* cited by examiner

Primary Examiner—Edward Lefkowitz
Assistant Examiner—Victor J. Taylor
(74) Attorney, Agent, or Firm—Merchant & Gould P.C.

(57) ABSTRACT

Methods and systems for characterizing and managing plots of land is provided. Information related to elevation, soil conductivity, crop yield, and grower history is organized into profiles to generate a management zone profile. The management zone profile divides the plot of land into agronomy zones having attributable characteristics related to the elevation, soil conductivity, crop yield, and grower history information. The management zone profile is utilized to create a variable prescription of items, such as fertilizer, seed and pesticides, to be applied to the plot of land.

15 Claims, 10 Drawing Sheets

METHODS AND SYSTEMS FOR MANAGING FARMLAND

FIELD OF THE INVENTION

The present invention relates to methods and systems for the management of agricultural plots of land. More specifically, information related to elevation, soil conductivity, satellite imagery, and grower yield history is extracted from the plots of land. The extracted information is used to generate a management zone profile and create a prescription for the plot of land.

BACKGROUND OF THE INVENTION

As the demand on the food supply increases and the total viable farmland decreases, methods and systems are needed that maximize crop yields. Maximum crop yields result in increased production of agricultural products and more value per acre of land. However, the effort in maximizing crop yields is difficult, time consuming, and costly because the characteristics of farmland vary from acre to acre. This variance is due to factors such as the conditions of the soil and topography. Further, a field may include significant acre-to-acre variations in nutrients, quality of crop produced, and ultimately crop yield.

For example, residual soil nutrients can vary considerable. Nitrate nitrogen can vary from about 15 lbs/acre to 150 lbs/acre. Quality of the crop can also show significant variability. For example, protein and test weight for wheat can range 2.5 percent in a single 40-acre field. The yield can vary as well. Typically, yields range from 50 percent less than the mean to 50 percent greater than the mean. Most applied nutrient amounts are determined by the expected yield of the crop. Therefore, it is important to determine yield potentials prior to application of fertilizers.

The soil type can also significantly affect crop yields. Agricultural lands are typically comprised of several different soil types, each of which may be categorized according to differences in soil texture, soil depth, and soil chemistry. Soil texture can be measure by examining the relative proportions of sand, silt, and clay contained within the soil.

Although any given plot of land or field may include many different soil types, it would be unusual if it did not include at least two substantially different soils having substantially different fertilization requirements. Some fields contain one dominant soil type that covers the majority of the field area with the remaining area made up of other different soil types. These other areas of different soil type are distributed around the field in various locations and have irregularly shaped boundaries, which often, but not necessarily, correspond to low or high spots. Often, a field contains a number of soil types. Ideally, each of the individual areas of different soil should be treated independently for the purpose of applying seed, fertilizer, or other items to the field.

Present methods determine nutrient requirements by taking soil samples from different areas of the field in a grid configuration. Characteristics such as soil composition and type can be assessed from the soil samples. Additionally, topography can be ascertained. Determining the soil characteristics from samples taken throughout a plot of land, particularly when the farm is thousands of acres, would require analysis on hundreds if not thousands of samples. Extracting and analyzing this multitude of soil samples is cost prohibitive and does not provide a viable method for maximizing agricultural output. Furthermore, the grid method may allow a varied number of soil types and elevations to be included within a single area due to the irregularity in shape of the different areas of the field. This is also problematic.

The current practice is to prescribe items, such as seed and fertilizer, to the entire plot of land or section of the land, if using the grid method, according to the needs of the most deficient soil, or according to the averaged requirements of the different soils. The result is that a substantial area of the field receives either more or less of the item being applied, resulting in significant waste of expensive of materials, such as fertilizer, and potentially lowering yields. In the field averaging method, only those sections which fall under average field characteristics will receive the proper field prescription leaving the remainder of the field without the correct seed, fertilizer, or chemical treatment. Both the deficient soil and field average methods fail to maximize field yields and output.

It would be desirable to develop system and methods that manage farmland to increase crop yields, maximize output per acre of land, and reduce costs associated with managing and assessing the crop yield potential for a field. The present invention addresses these needs.

SUMMARY OF THE INVENTION

Generally, the present invention relates to methods and systems for providing a prescription of at least one item to a plot of farmland. In accordance with the present invention, the above and other problems are solved by creating a management zone profile that is based upon information extracted from the plot of land.

In accordance with one aspect, the present invention relates to a method for A method for characterizing a plot of land, the method comprising the steps of: generating an elevation profile for the plot of land; generating a soil conductivity profile for the plot of land; generating a satellite image profile of the plot of land; and analyzing the elevation profile, the soil conductivity profile, and the satellite image profile to generate a management zone profile.

In accordance with other aspects, the present invention relates to a method for characterizing a plot of land, the method comprising the steps of: collecting elevational information on the plot of land; collecting soil conductivity information on the plot of land; collecting satellite imagery information on the plot of land; correlating the elevational information, the soil conductivity information, and the satellite imagery information to a latitude and longitude to produce an elevation profile, a soil conductivity profile, a satellite imagery profile, and a grower history profile; and providing the elevational profile, the soil conductivity profile, and the satellite imagery profile for analysis to generate a management zone profile.

In accordance with other aspects, the present invention relates to a method for characterizing a plot of land, the method comprising the steps of: providing elevational information on the plot of land; providing soil conductivity information on the plot of land; providing infrared satellite imagery information on the plot of land; correlating the elevational information, the soil conductivity information, and the satellite imagery information to a latitude and longitude to produce an elevation profile, a soil conductivity profile, a satellite imagery profile, and a grower history profile; and providing the elevational profile, the soil conductivity profile, and the satellite imagery profile for analysis to generate a management zone profile.

In accordance with other aspects, the present invention relates to a method for managing a plot of land, the method comprising the steps of: generating an elevation profile for the plot of land; generating a soil conductivity profile for the plot of land; generating an satellite image of the plot of land; analyzing the elevation profile, the soil conductivity profile, and the satellite image profile to generate a management zone profile, wherein the management zone profile is divided into two or more agronomy zones; obtaining at least one soil sample from each of two or more agronomy zones; analyzing the at least one soil sample obtained from each of the two or more agronomy zones; and applying a prescribed amount of at least one item to the plot of land based upon based upon the analysis of the at least one soil sample obtained from each of the two or more agronomy zones and the management zone profile.

In accordance with other aspects, the present invention relates to a method of analyzing information organized into a profile and for transforming the profile into a management zone profile, the method comprising: storing the profile into a memory; analyzing attributes of the profile; mapping analyzed attributes of the profile into a management zone profile, wherein the management zone profile comprises two or more agronomy zones; and whereby a user can extract meaning from the management zone profile by comprehending the relationships between the two or more agronomy zones.

In accordance with other aspects, the present invention relates to a method of analyzing information organized into at least two profiles and for transforming the profiles into a management zone profile, the method comprising: storing the at least two profiles into a memory; analyzing attributes of the at least two profiles; mapping analyzed attributes of the at least two profiles into a management zone profile, wherein the management zone profile comprises two or more agronomy zones; and whereby a user can extract meaning from the management zone profile by comprehending the relationships between the two or more agronomy zones.

In accordance with other aspects, the present invention relates to a system for analyzing an elevational profile, a soil conductivity profile, and a satellite image profile, and for transforming the profiles into a management zone profile, the system comprising: a memory configured with a data structure for maintaining an arrangement of the profiles; and a processor configured to map attributes of the profiles into the management zone profile.

In accordance with other aspects, the present invention relates to a computer-readable medium encoded with data representing a computer program which can cause a computer, having a processor, a memory and an output device, to analyze data organized into at least two profiles and for transforming the at least two profiles into a management zone profile, the computer program comprising a method for: storing the at least two profiles into a memory; analyzing attributes of the at least two profiles; mapping analyzed attributes of the at least two profiles into a management zone profile, wherein the management zone profile comprises two or more agronomy zones; and whereby a user can extract meaning from the management zone profile by comprehending the relationships between the two or more agronomy zones.

In accordance with other aspects, the present invention relates to a system for determining agricultural yield potentials for a plot of land comprising: an elevation profile for the plot of land; a soil conductivity profile for the plot of land; a satellite image profile for the plot of land; a memory configured with a data structure for storing the elevation profile, the soil conductivity profile, and the satellite image profile; and a processor configured to analyze the elevation profile, the soil conductivity profile, and the satellite image profile to generate a management zone profile.

The above summary of the present invention is not intended to describe each disclosed embodiment or every implementation of the present invention. The Figures and the detailed description, which follows, more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
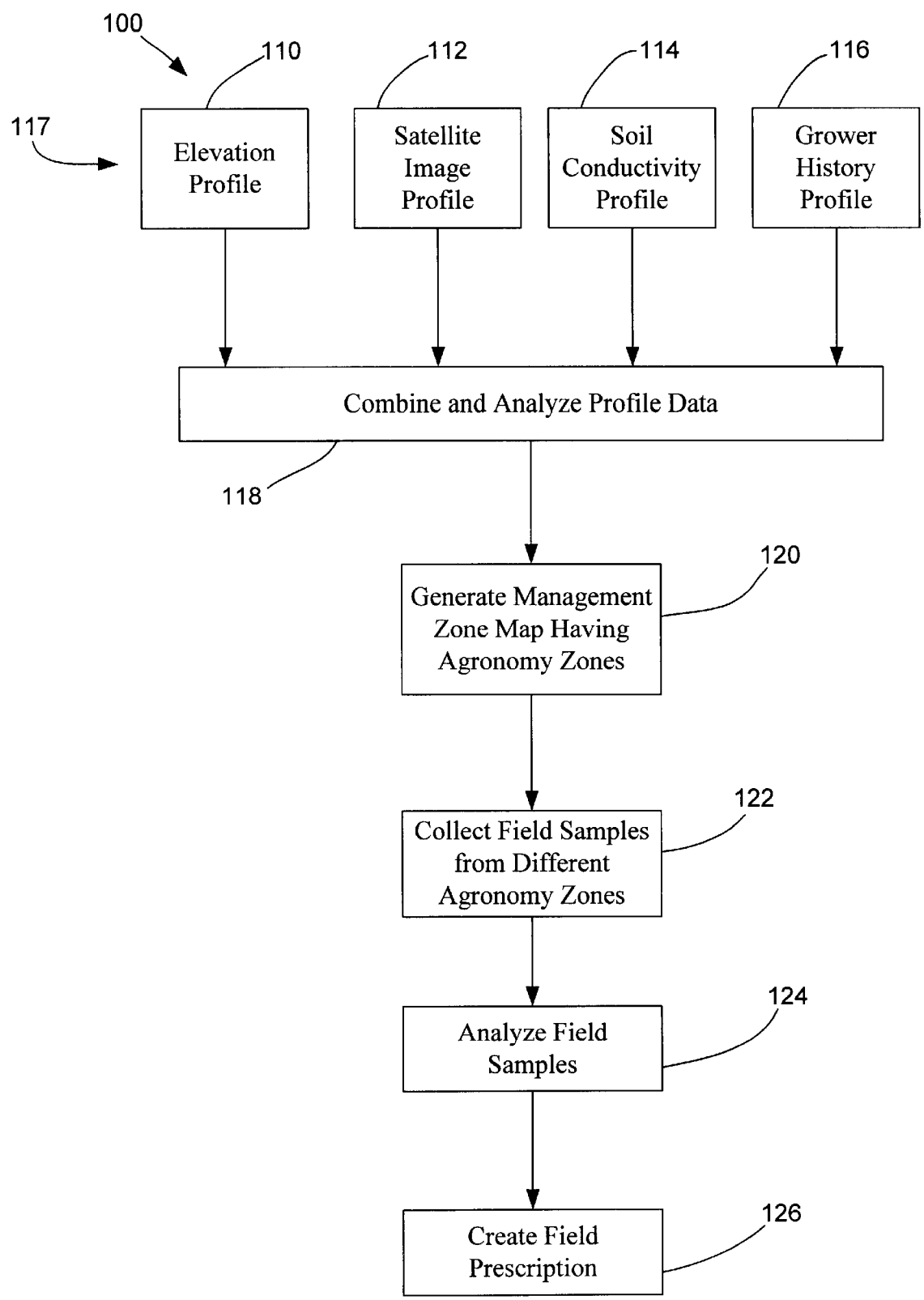
FIG. 1 is a schematic block diagram of one embodiment of a method for managing a plot of land, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention is believed to be applicable to management of farmland. In particular, the present invention is directed to methods and systems that create a management zone profile that reduce the number soil samples required for determining the proper prescription of items to plots of land. While the present invention is not so limited, an appreciation of various aspects of the invention will be gained through a discussion of the examples provided below.

Referring to FIG. 1, a schematic block diagram of one embodiment of the present invention is shown. A method for the agricultural management of a plot of land 100 is shown. The method 100 uses layers of information or profiles extracted from measurements collected or extracted from a plot of land. The plot of land is any piece of property that includes at least some vegetation. The layers of information include an elevation profile 110, a satellite imagery profile 112, a soil conductivity profile 114, and a grower history profile 116, collectively named profiles 117. A profile is information extracted from the plot of land that is correlated with a latitude and longitude. Data from the layers of information are combined and analyzed 118 to generate a management zone profile 120. The management zone profile 120 includes two or more agronomy zones that correspond to varying attributable characteristics. Attributable characteristics include, for example, areas of depression, hilltops, high soil conductivity, medium soil conductivity, low soil conductivity, high crop yield, medium crop yield, low crop yield, and potentially other attributable characteristic categories.

At least one field sample is collected from each of the two or more agronomy zones 122. The at least one field sample from each of two or more agronomy zones are analyzed 124 for their composition. The field sample composition data and management zone profile 120 are then examined to create a variable field prescription 126 of fertilizer, seed, chemicals, or other items to be applied to the field.

Collection of Plot of Land Data

Figure 2:
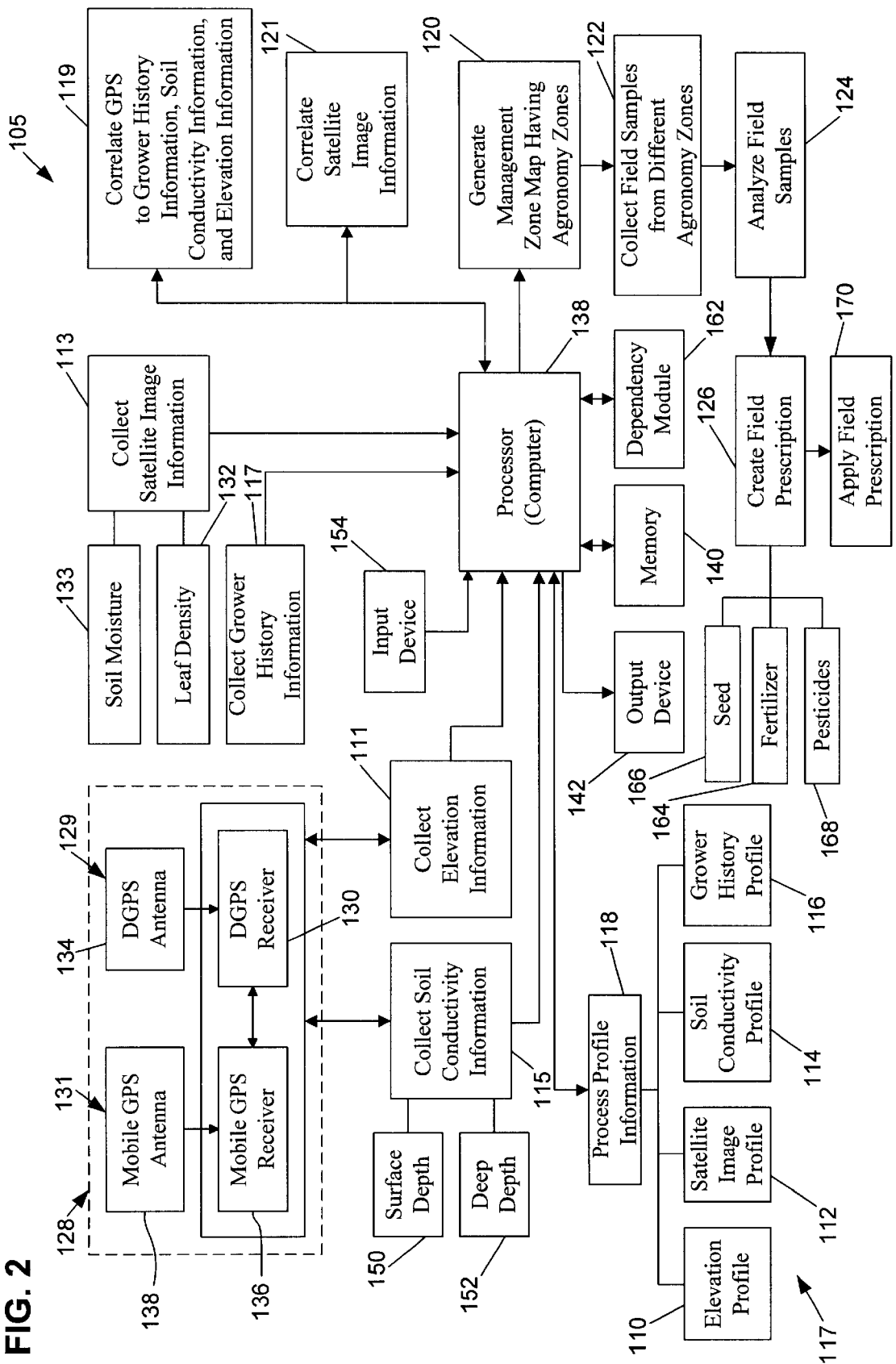
FIG. 2 is a schematic block diagram of a system for managing a plot of land, according to the invention.

Referring to FIG. 2, an agricultural management system 105 is shown. The agricultural management system collects data or information from a plot of land for the generation of the elevation profile 110, the satellite image profile 112, the soil conductivity profile 114, and the grower history profile 116. In some embodiments, at least two of the profiles 117 are used to generate the management zone profile 120.

Elevation Profile

Referring to FIG. 2, the elevation profile 110 for the plot of land can be determined with a Global Positioning System (GPS) 128. A real time base station GPS with a stationary differential GPS (DGPS) 129 is used to collect the elevation information 111. The DGPS 129 includes a receiver 130 with an associated radio transmitter and an antenna 134. The DGPS is placed in a stationary position in the plot of land. The DGPS receiver 130 determines position based upon signals transmitted from the GPS satellite network. The exact longitude, latitude, and altitude of the base station DGPS receiver 130 are entered for reference.

The GPS 128 also includes a mobile GPS 131. The mobile GPS 131 includes a receiver 136 with an antenna 138. The mobile GPS receiver 136 also obtains positional information from the GPS satellite network. The mobile GPS receiver 136 is coupled to a device, such as a vehicle, that traverses the plot of land. During the collection of elevational information, the mobile GPS 136 calculates position (latitude, longitude, and altitude) relative to the stationary DGPS 129. The accuracy of the positional data is improved by applying correction signals received by DGPS receiver 130 that can be transmitted to the mobile GPS 136. The data related to these coordinates is collected through a computer processor 138 and stored into memory 140.

The longitude and latitude coordinates outline a field border 146 of the plot of land being examined. The longitude and latitude are correlated with the elevational information 111 (altitude) which creates the elevation profile 110. Preferably, the GPS 128 determines altitude with a 2-centimeter resolution and latitude and longitude with a 1-centimeter resolution. A GPS 128 able to achieve these resolutions is available from Trimble Navigation Limited located in Sunnyvale, Calif.

The data related to the coordinates or profile for the plot of land can be used to develop a digitized two or three-dimensional elevational profile 110 of the plot of land. The elevational profile 110 can be displayed on an output device 142 that is coupled to the computer processor 138. Any suitable output device 142 can be used to exhibit the the computer processor 138. Any suitable output device 142 can be used to exhibit the elevational profile 110, such a display screen or a hardcopy printout from a computer printer.

Figure 3:
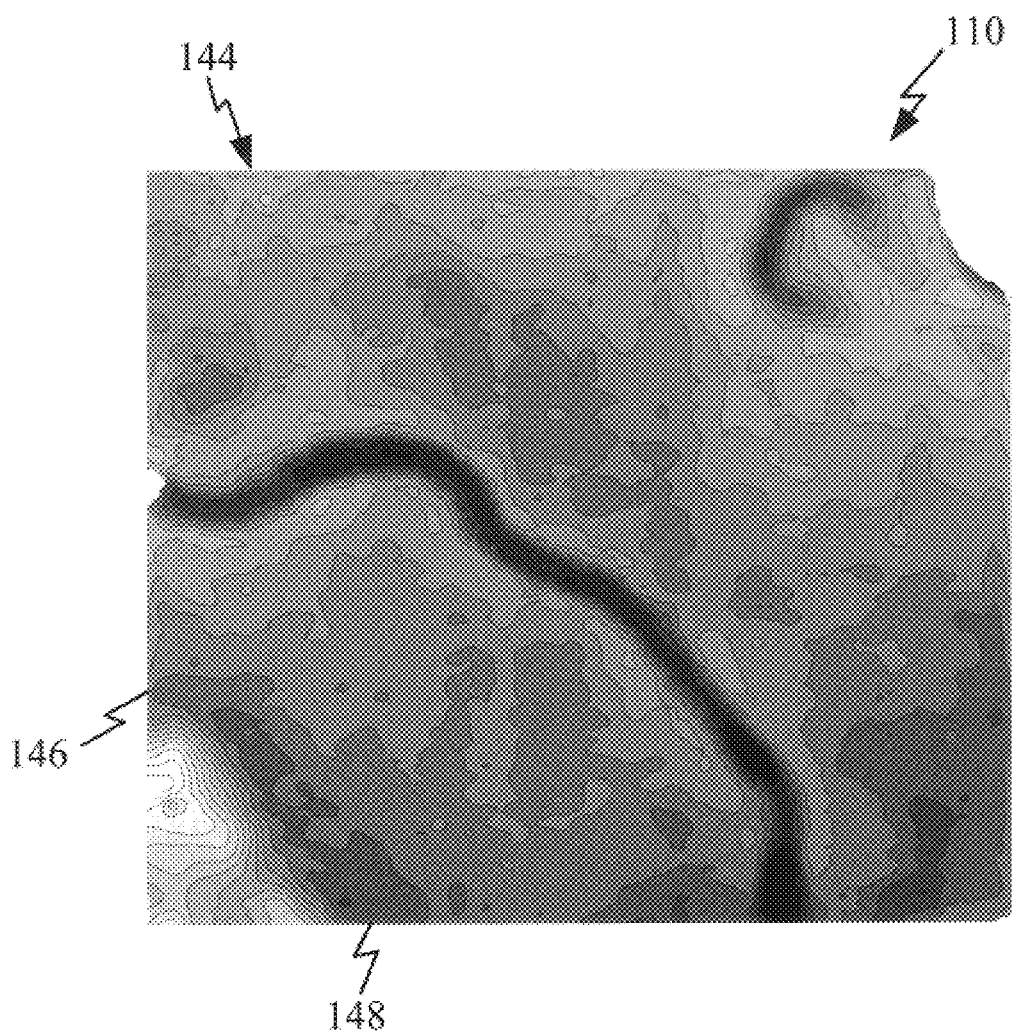
FIG. 3 illustrates a representative elevational profile for a plot of land.

An example of elevational profile 110 that is displayed as a 2-dimensional map is illustrated in FIG. 3. Elevation profile 10 of FIG. 3 is generated from traversing the GPS 128 over the plot of land 144 to collect positional data and defines the field border 146. The elevational profile 110 in FIG. 3 includes an area that is approximately one hundred and fifty acres. The elevational profile 110 can include definable areas, such as a depression 148, which can affect crop yield, soil moisture, and residual nutrient levels in the soil. Areas of lower elevation are indicated by the darker shaded regions and areas of higher elevation are indicated by the lighter shaded regions. Lines shown in FIG. 3 indicate changes in elevation. Alternatively, a color version of the elevation profile can be used to show elevation for the plot of land.

Satellite Image Profile

Referring to FIGS. 1 and 2, satellite imagery is used to generate the satellite image profile 112. Satellite imagery, such as near infrared, collects satellite image information 113 on crop leaf density 132 at various stages during the growing season. The satellite image acquired for determining leaf density 132 is correlated to the field border of the plot of land, such as field border 146 of FIG. 3, that is defined during the acquisition of the elevation profile 110. The satellite image is correlated 121 to the field border by positioning the image over the field border, matching the field border to the satellite image, and disregarding parts of the image outside of the field border.

Figure 4:
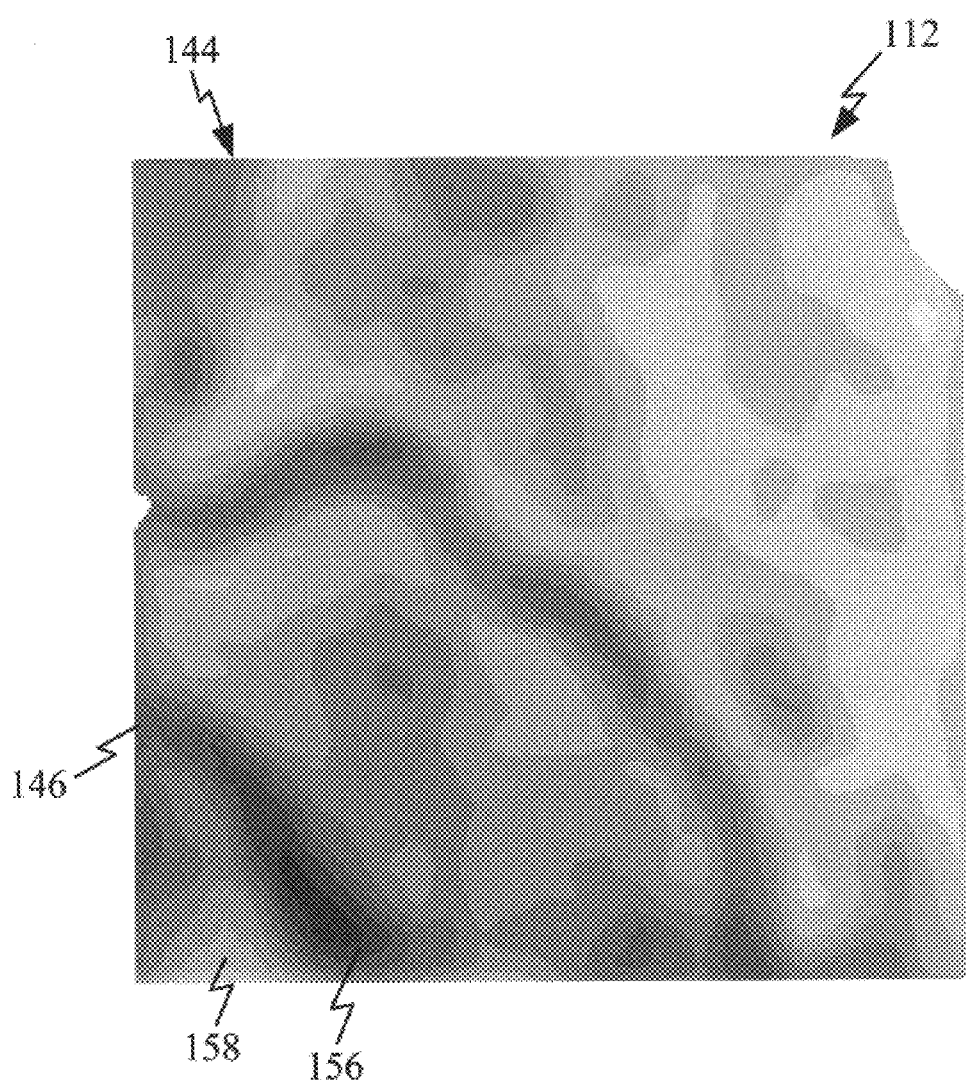
FIG. 4 illustrates a representative satellite image profile for the plot of land of FIG. 3.

The satellite image profile 112 is generated during the growing season to capture leaf density 132. A satellite image profile for small grains, such as wheat, barley, oats, and rye, is typically generated during the month of June. A satellite image profile for row crops, such as corn, soybeans, sorghum, sunflowers, and potatoes, is typically generated during the months of July to August. The timing for collection of the satellite image profile can vary for both small grain and row crops depending on factors, such as location and climate. Near infrared satellite imagery has a typical resolution range An example of a representative satellite image profile 112 measuring leaf density is shown in FIG. 4. This satellite image profile 112 corresponds to the same plot of land 144 used for elevational profile 110 in FIG. 3. Preferably, the satellite image profile 112 is provided as a colorized map.

FIG. 4 is a gray scale representation of the satellite image profile 112. The satellite image profile 112 includes varied intensities generated from the satellite image. The varied intensities are directly related to leaf density 132, which is an indicator of crop yield. The variation in intensity on the profile 112 can be used to determine areas of low, medium, or high crop yield. Areas of higher yield are indicated in the lighter shaded regions and areas of lower yield are indicated in the darker shaded regions.

The satellite image profile 112 is typically created once. The profile 112 is then used in subsequent years to indicate crop yields for the plot of land. If either a significant man-made or weather related change occurs, the satellite image profile 112 can be update by obtaining another satellite image of the plot of land. For example, a grower may alter the drainage pattern of the field, which could impact yield potential because some portions of the plot of land may be receive either more or less moisture. This could translate into more or less agricultural output for a particular location than in previous years that requires creating a new satellite image profile.

Figure 5:
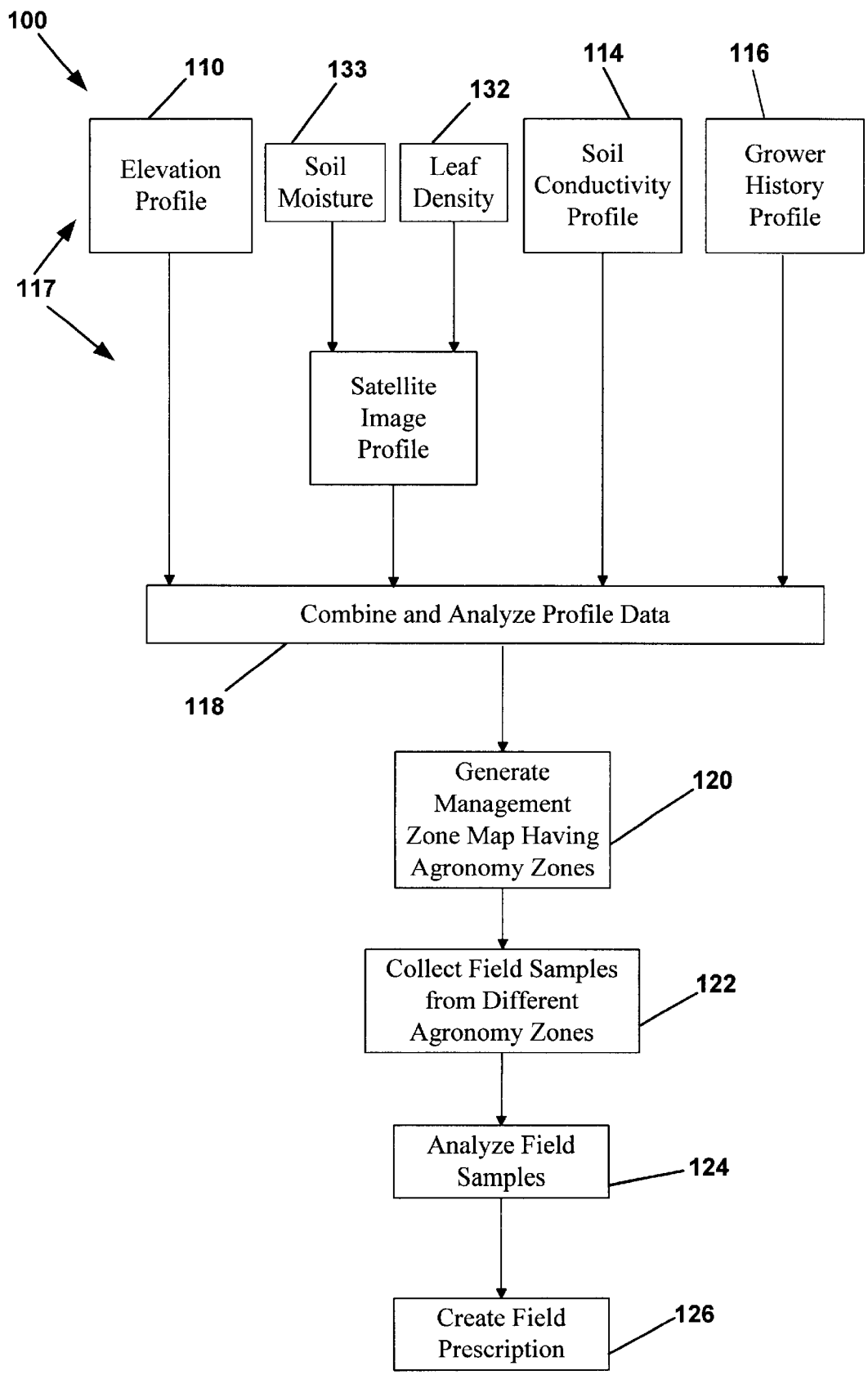
FIG. 5 is a schematic block diagram of a second embodiment of a method for managing a plot of land, according to the invention.

FIG. 5 shows a second embodiment of a method for managing a plot of land using the management zone profile 120. The satellite image profile 112 provides information related to leaf density 132 during the growing season, as well as soil moisture 133 prior to the growing season.

The moisture capacity properties of different soil types can produce varied intensities on the infrared satellite image for soil moisture 133 measurements taken before the growing season. The satellite image produces a comparatively accurate soil map in which the various soil types are represented by different intensities corresponding the different moisture contents. The different moisture contents can be discerned because the organic matter content of each soil type is closely related to its moisture content. As the organic matter content increases, a different soil type is indicated. This pre-growth satellite image profile provides useful information for determining crop yield potentials. The soil moisture 133 information can be combined with leaf density 132 measurements acquired during the growing season, and then further combine with other profiles (elevation, satellite image, or grower history) to generate the management zone profile 120.

Soil Conductivity Profile

As shown in FIG. 1, a soil conductivity profile 114 can also be determined. The soil conductivity profile 114 is combined with other profiles to generate management zone profile 120.

The varied soil types have widely different soil electrical conductivity characteristics. The electrical conductivity of each the soils is directly related to its nutrient holding capacity, soil texture, and other characteristics, such as salinity, soil depth, organic carbon content, cation-exchange-capacity, and water holding capacity. Typically, soil conductivity values for clay soils are higher than those for sand. Soil texture typically relates to the top six inches of soil, and controls the release and adhesion of minerals, water flow through soil, and proliferation of roots through the soil. Determining the amount of residual nutrients in the soil, allows a farmer to assesses the ability of that soil to yield crops as well as the amount of nutrients that need to be applied to the soil based upon residual nutrient levels.

Soil conductivity is measured through instruments that penetrate into the soil as they are passed over the field. The soil conductivity profile 114 is generated when soil conductivity is measured over the entire plot of land, such as plot of land 144. The soil conductivity information 115 is correlated to a position within the plot of land 119. The soil conductivity information 115 can be geo-referenced with a system 119, such as GPS 128 described above, to produce a profile that shows the changes in soil conductivity or topsoil depth.

Figure 6:
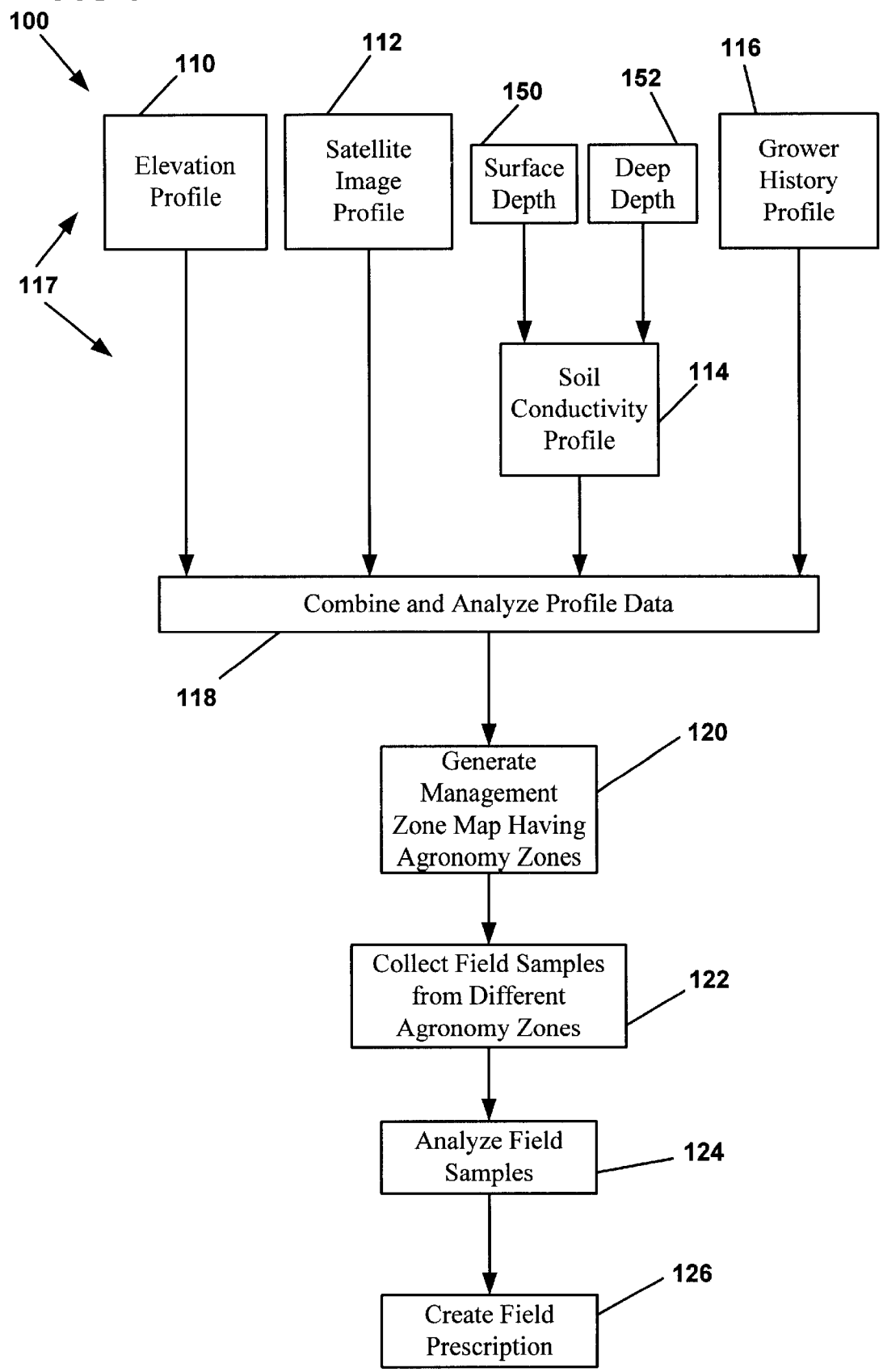
FIG. 6 is a schematic block diagram of a third embodiment of a method for managing a plot of land, according to the invention.

Referring to FIG. 6, another embodiment of a method for managing a plot of land is shown. The soil conductivity profile 114 includes collecting information at a surface depth 150 and a deep depth 152. The soil conductivity information obtained from the surface depth 150 and deep depth measurements are correlated to positions with the plot of land. The correlation of the surface depth 150 data to a location creates a surface depth soil conductivity profile. The correlation of the deep depth 152 data to a location creates a deep depth soil conductivity profile. The two depth profiles are added together to generate the soil conductivity profile 114.

The surface depth 150 typically ranges to a maximum depth of about 25 centimeters. The deep depth 152 typically ranges to a maximum depth of about 75 centimeters. The soil within the surface depth 150 provides greater value to crop growth and more significantly influences the soil conductivity profile 114 because the deep depth 152 measurement includes soil conductivity reading for the about 25 centimeters of surface depth 150 as well as the remaining about 50 centimeters of the deep depth 152.

Figure 7:
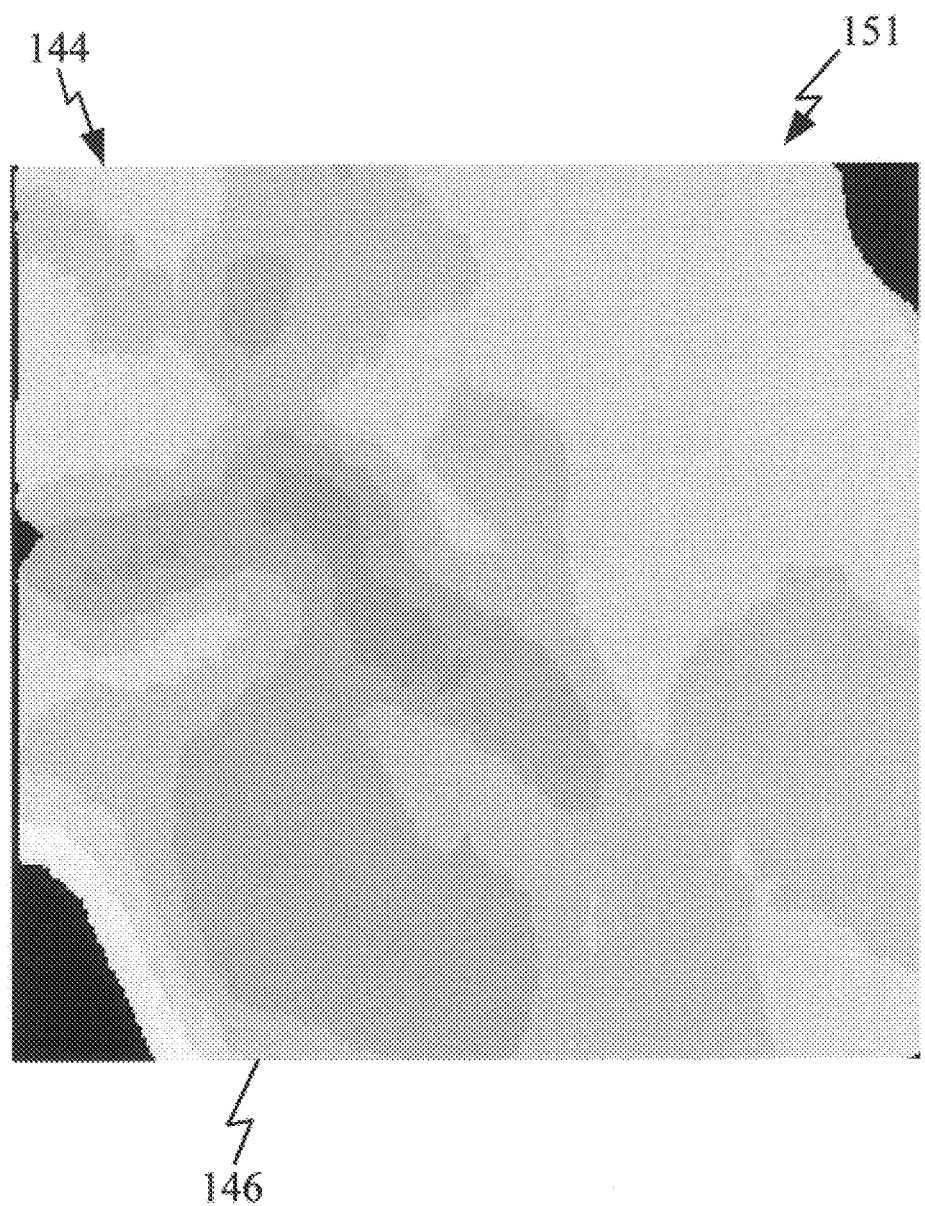
FIG. 7 illustrates a representative surface depth soil conductivity profile for the plot of land of FIG. 3.
Figure 8:
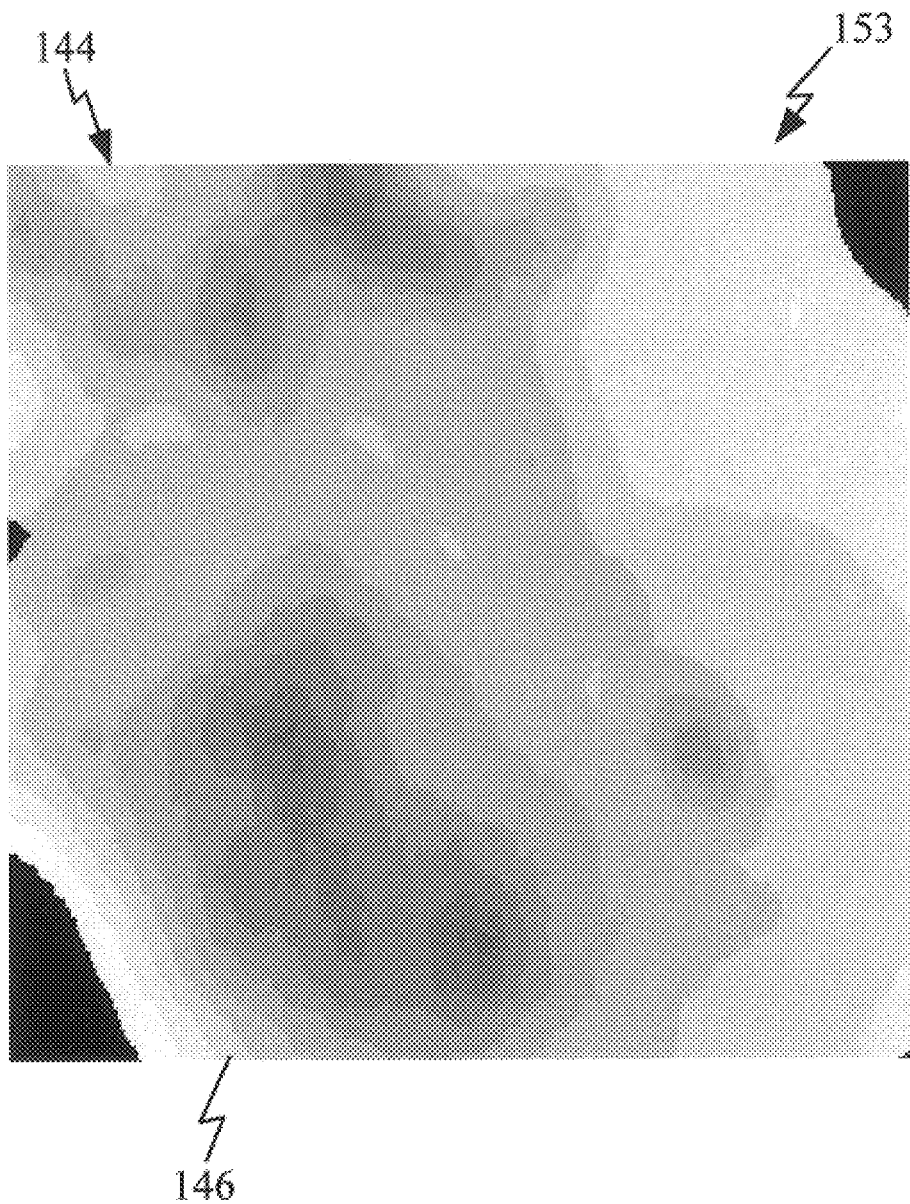
FIG. 8 illustrates a representative deep depth soil conductivity profile for the plot of land of FIG. 3.

A representative soil conductivity profile 114 for a surface depth 150 is shown in FIG. 7 and corresponds to plot of land 144 of FIG. 3. A representative soil conductivity profile 114 for a deep depth 150 is shown in FIG. 8 and corresponds to plot of land 144 of FIG. 3. The soil conductivity profiles of FIGS. 7 and 8 were added to one another to create an overall soil conductivity profile 112, shown in FIG. 9. Preferably, the soil conductivity profile 114 is provided as colorized map.

Figure 9:
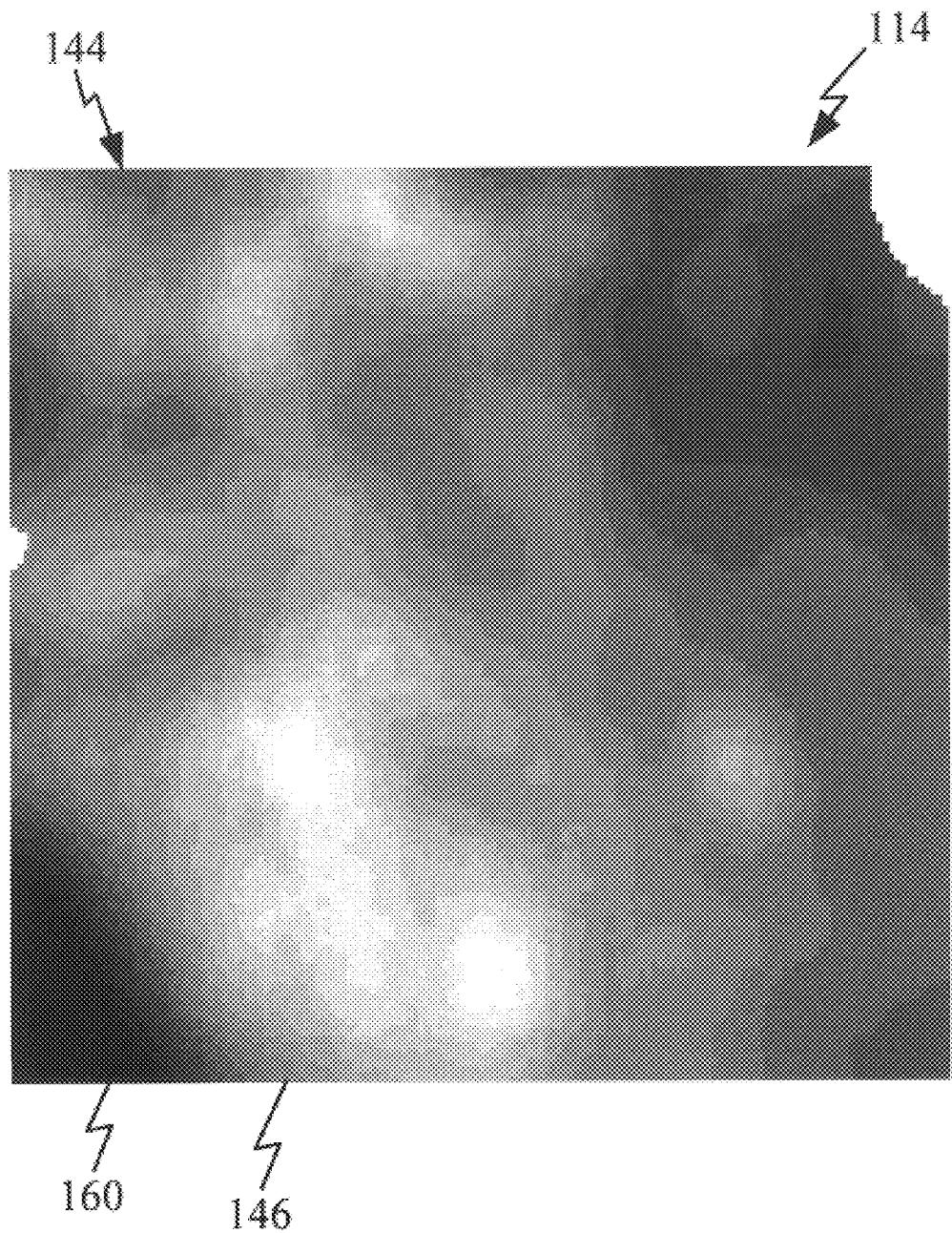
FIG. 9 illustrates a representative overall soil conductivity profile based upon the surface depth soil conductivity profile of FIG. 7 and the deep depth soil conductivity profile of FIG. 8.

FIGS. 7–9 are gray scale representations of the soil conductivity profile 114. The varied intensities shown in FIGS. 7–9 are directly related to soil conductivity measurements. The variation in intensity on the profile can be used to determine areas of low, medium, or high electrical conductivity. Referring to FIGS. 7–9, areas of higher conductivity are indicated in the lighter shaded regions and areas of higher conductivity are indicated in the darker shaded regions.

Any suitable device for measuring soil electrical conductivity can be used. One example of a suitable device is described in U.S. Pat. No. 5,841, 282 (Christy and Lund), incorporated herein by reference. The device includes a frame adapted to traverse over a ground surface. A plurality of soil engaging coulters is attached to the frame. This device passes current between a first pair of coulters and through the soil, measuring this current. The device measures the resulting voltage between a second pair of coulters. The device is further able to calculate soil conductivity from the voltage and current measurements. In addition, this device is capable of simultaneously measuring soil conductivity of at least two different soil depths in a single pass, such as surface depth 150 and deep depth 152. A source for a suitable soil conductivity measuring device is Veris® Technologies located in Salina, Kans.

Grower History Profile

Referring to FIGS. 1 and 2, the history of a grower's field can also be used to create a grower history profile 116, which can be combined with other profiles to generate the management zone profile 120. The grower history profile 116 includes determining the agricultural output for a particular location of the field. Data or information from any past year of agricultural production can be used to generate the grower history profile 116. The grower history profile from one year can be combined with other past year agricultural output data to generate a normalized multi-year grower history profile. Alternatively, data for a single year can be used to generate the grower history profile. The single or multi-year grower history profiles can also be used to provide a grower with yield potentials for the plot of land.

Any suitable harvesting implement can be used to determine agricultural output. For example, a combine can be used to harvest a crop and monitor yield. Information or data regarding the yield at a particular location can be collected with an on-board computer housed within the combine. A suitable device for determining agricultural output is disclosed in U.S. Pat. No. 5,995,894 (Wendte), incorporated herein by reference. The crop yield is monitored correlated to a particular location on the plot of land 119 with a GPS, such as GPS 128 described above.

Profile Data Collection, Storage, and Display

Referring to FIG. 2, data or information that is generated, measured or extracted from the plot of land, such as plot of land 144, is routed through processor 138. The processor 138 for the software that provides for data collection or analysis can be located within the local server of a computer or, alternatively, in a remote location. The processor 138 communicates with the operator through a user input device 156, such as a standard keyboard or mouse. The operator can use the input device 156 to order the processor to execute a program that is stored with a memory 140.

The memory 140 is any suitable memory that participates in providing instructions to the processor 138. The memory 140 can take many forms including, but not limited to, non-volatile media and volatile media. Non-volatile media includes, for example, optical or magnetic disks, as a storage device, and ROM. Volatile media includes RAM and dynamic memory, such as a main memory. Various forms of memory can be involved in carrying one or more sequences of one or more instructions as well as algorithms, which are readable by the processor 138. For example, the instructions can initially be borne on a magnetic disk of a remote computer. The remote computer can load the instructions into its dynamic memory and send the instructions over any suitable data transmission link to the processor located with a local server. Alternatively, the processor 138 with the local server can retrieve the instructions directly from the magnetic disk in a disk drive, or load the instructions from the magnetic disk into its dynamic memory for use. The processor 138 then retrieves and executes the instructions.

The data that generates the profiles 117 is collected and processed. The processor 138 can correlate the data or information collected on elevation, soil conductivity, or prior year crop yield to GPS 128 positional data or information. The memory 140 is configured with a data structure for maintaining an arrangement of the profiles 117. The profiles can be stored on the memory 140 for future analysis. The profiles can also be displayed on any suitable output device 142, such as a display screen or computer printout, in the form of a map that includes areas of that range in color or shading that distinguish various characteristics for the plot of land, such as, altitude (elevation profile), leaf density related to present crop yield (satellite image profile), soil moisture (satellite image profile), soil conductivity related to soil composition (soil conductivity profile), and prior year crop yields (grower history profile). It is contemplated that the profiles 117 need not be displayed on the output device 142. The information can be stored into memory 140 and manipulated as data without the user viewing a display of the profiles 117.

Although FIG. 2 shows a single computer processor and memory, multiple processors and memories can be used to process and store the information for the profiles.

Creating a Management Zone Profile

The elevation profile 110, the satellite imagery profile 112, the soil conductivity profile 114, and grower history profile 116, represent different layers of information that are analyzed to generate a management zone profile 120. The individual layers of information or profiles 117 are combined, analyzed, and compared through a computer software program called AGIS®, which is available from Delta Data Systems, Inc. located in Picayune, Miss. Processor 138 can retrieve the profiles 117 from memory 140 and conduct the manipulation of the data to generate the management zone profile 120.

For each of the profiles 117 a formula, or algorithm, is operated on the data to divide the data into divisions. The divisions create a sub-grouping within each of the profiles 117. Each sub-grouping within a profile provides attributable characteristics to sections of the plot of land. The processor 138 can map the attributable characteristics to generate the management zone map 120.

Following data analysis, processing, and categorization of the profile information into sub-groupings, the profiles are used to categorize a given portion or section of the plot of land into two or more agronomy zones based upon the attributable characteristics of the plot of land. The number of agronomy zones depend upon the number of profiles used and the number of sub-groupings created within each profile. The distinguishable portions or sections of land on the management zone profile can be resolved to about one-half an acre or greater.

In one embodiment, twelve agronomy zones are included and sections of the plot of land, such as plot of land 144, are categorized into one of the following zones:

| | |
|---|---|
| Zone 1 | Low to medium yield/Hilltop or Ridge. |
| Zone 2 | High yield/Depression. |
| Zone 3 | Low yield/Depression. |
| Zone 4 | Low yield/High soil conductivity |
| Zone 5 | Low yield/Medium soil conductivity |
| Zone 6 | Low yield/Low soil conductivity. |
| Zone 7 | Medium yield/High soil conductivity. |
| Zone 8 | Medium yield/Medium soil conductivity. |
| Zone 9 | Medium yield/Low soil conductivity. |
| Zone 10 | High yield/High soil conductivity. |
| Zone 11 | High yield/Medium soil conductivity. |
| Zone 12 | High yield/Low soil conductivity. |

Each of the agronomy zones includes attributable characteristics that are based upon analysis of the data for the profiles 117. For example, a section of the plot of land categorized as Zone 1 includes a depression, which is a subgrouping for the elevational profile, and low to medium yield, which is a subgrouping of the satellite imagery profile and optionally the grower history profile.

The elevation profile 110 can include two or more attributable characteristics that are categorized within the agronomy zones of the management zone profile 120. For example, the elevation profile 110 can be divided into areas of depression and areas of hilltops or ridges.

A depression is an area in which the elevation decreases on three to four sides of the lowest point within that area being examined. The depression has little or no surface drainage potential and tends to pool water and collect deposits of soil from other agronomy zones. Drainage potential can be assessed using soil sample analysis, the elevation profile 110, and the soil conductivity profile 114. The soil sample analysis, described below, can also be used to determine if soil is being deposited in the subject area through wind and water erosion.

A hilltop or ridge includes an area that is sufficiently elevated to be exposed to wind and water erosion. A portion of the plot of land is characterized as a hilltop through examination of two and three-dimensional views of the elevation profile. Typically, hilltops include areas that are less than ten acres in size. Ridges can extend for distances longer than hilltops within the plot of land. Hilltops or ridges can also be defined with a pre-growth satellite image profile that assesses the moisture content of the soil. Areas containing less moisture can further indicate hilltop or ridge areas.

Soil conductivity as examined from the soil conductivity profile 114 includes three categories indicating low, medium, and high soil conductivity. An algorithmic operator is applied to the soil conductivity profile 112 to organize the profile data into the three categories. The processor 138 can apply the algorithmic operation on the profile data. The mean soil conductivity can be determined for the field. The cut-off points for the three categories are then determined by taking plus and minus one-half of the standard deviation of the soil conductivity values from the mean. Below minus one-half the standard deviation from the mean indicates an area of low conductivity. Greater than plus one-half the standard deviation from the mean indicates an area of high conductivity. Values in between high and low conductivity indicate an area of medium soil conductivity. The cut-off values for soil conductivity can be altered by modifying the formula or algorithmic operation.

The satellite image profile 112 that shows leaf density 132 and the growth history profile 116 are treated similarly to the soil conductivity profile 114. Leaf density 132 and growth history, as examined from satellite imagery profile 112 and the growth history profile 116 respectively, include three categories indicating low, medium, and high crop yield.

An algorithmic operator is applied to the data to organize the profiles into the three categories, respectively. The cut-off points for the three categories are then determined by taking plus and minus one-half of the standard deviation of the imagery leaf density 132 and agricultural output values, respectively, from the mean. Below minus one-half the standard deviation from the mean for both profiles indicates an area of low yield. Greater than plus one-half the standard deviation from the mean for both profiles indicates an area of high yield. Values in between high and low profiles indicate an area of medium yield, which are categories for both the satellite image profile 112 and growth history profile 116.

Figure 10:
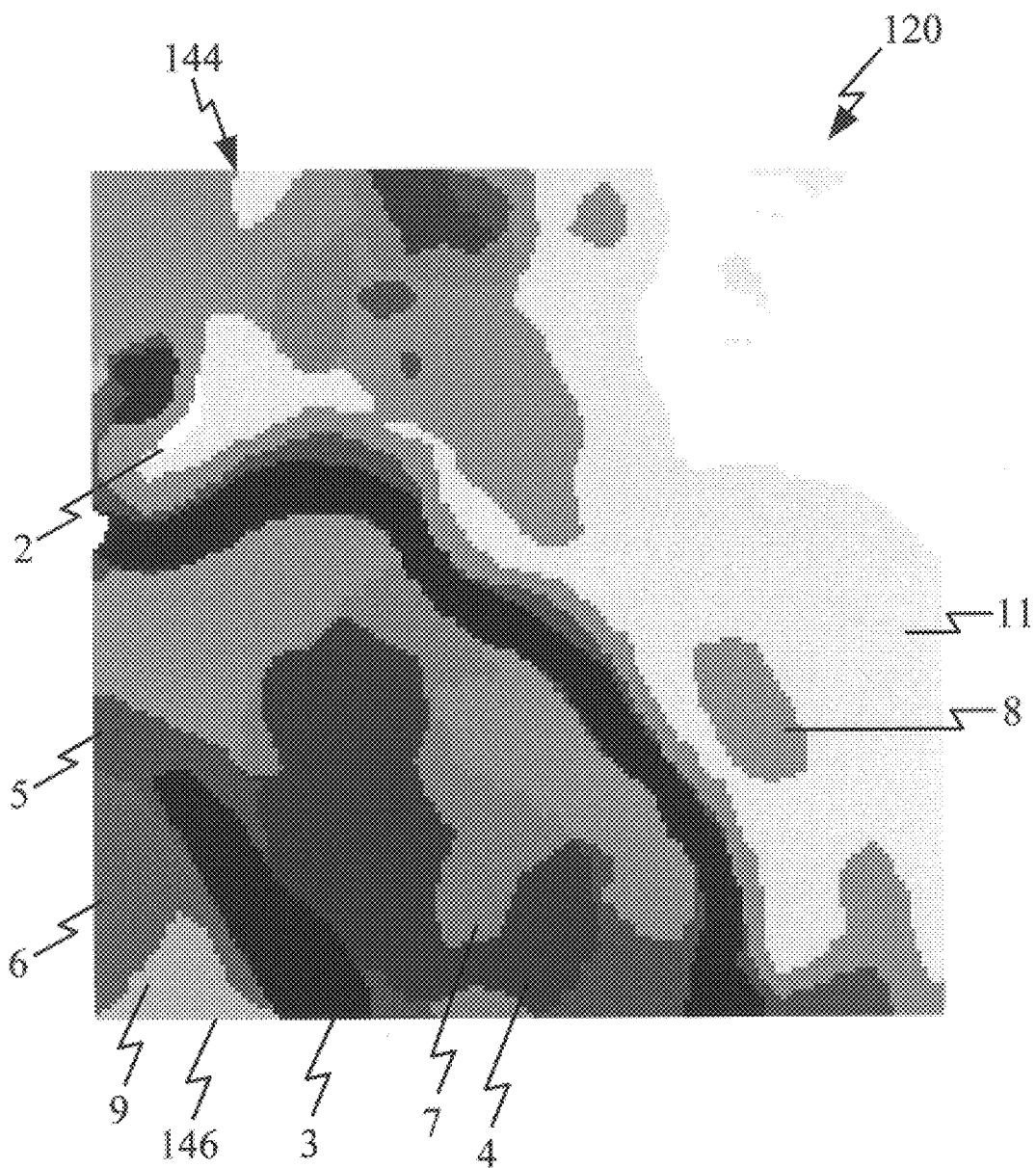
FIG. 10 illustrates a representative management zone profile for the plot of land of FIGS. 3–4 and 7–9.

Referring to FIG. 10, a management zone profile 120 is shown for the plot of land 144 of FIGS. 3–4 and 7–9. The profile 120 is a digitized representation of the plot of land 144 in which each pixel represents an area of three meters by three meters. Alternatively, each pixel can represent areas greater than or less than three meters by three meters.

Based upon information from the elevational profile, the satellite image profile 112, and the soil conductivity profile 114, the management zone profile 120 was created. The divisions between the agronomy zones are shown by the difference in the shading on the management zone profile 120. Representative plot of land 144 includes nine of the twelve agronomy zones described above. Represented are Zones 2, 3, 4, 6, 7, 8, 9, 11, 12. Each of the represented agronomy zones includes the attributable characteristics of the corresponding profiles 117. For example, a portion of the plot of land 144 categorized into Zone 3 can be correlated to the elevation profile 110 of FIG. 3, which shows a depression 148, and to the satellite image profile of FIG. 4, which shows a corresponding area of low yield 156. A portion of the plot of land 144 categorized into Zone 9 in the management zone profile of FIG. 10 can be correlated with to the satellite image profile 112 of FIG. 4, which shows that the corresponding area 158 has a medium yield, and the soil conductivity profile of FIG. 9, which shows an area of low soil conductivity 160.

Referring to FIG. 2, the information contained within the profiles 117 that is divided into subgroupings can be correlated using a dependency module 162 that is coupled to the processor 138. The dependency module 162 can include an additional processor to determine dependencies between the profiles 117 and categorize a portion of the land into an agronomy zone. For example, a portion of the plot of land may qualify as a depression on the elevation profile 110 and exhibits high yield on the satellite image profile 112. The dependency module correlates the data of the elevation profile 110 and the satellite image profile 112 to place the portion of the plot of land into Zone 2.

Sampling the Zones

Referring to FIGS. 1 and 2, the method for agricultural management of a plot of land 100 and the agricultural management system 105 can include a step of collecting field samples from the agronomy zones. The collection of samples based upon the management zone profile 120 is developed through a sampling mission for the plot of land 144. The sampling mission is a series of sampling points that lie in the plot of land 144 from which a soil sample is extracted. Each of the agronomy zones will have at least one soil sample 122 extracted. Preferably, each zone will have about five to ten sampling points or samples extracted, which is significantly less samples than is required for present methods of managing farmlands. When multiple soil samples are extracted for a particular agronomy zone, the samples are combined to create an average sample for the agronomy zone.

The soil samples from the agronomy zones are then analyzed 124 for composition. The analysis can measure residual nutrient levels, soil texture, bulk density, water holding capacity, percent soil moisture, organic matter, percent based saturation, soluble salts, pH, and cation exchange capacity. One to all of these measurements can be conducted on the extracted sample. Residual nutrient measurements can determine, for example, levels of nitrate nitrogen, ammonia nitrogen, copper, calcium, magnesium, manganese, iron, sodium, boron, phosphorous, potassium, sulfur, zinc, and chloride within the soil. One to all of these measurements can be conducted on the extracted sample. The soil sample analysis can be used to determine the field prescription 126 for a particular agronomy zone.

Creating and Applying a Prescription for the Management Zones

The management zone profile 120 and soil sample analysis 124 can be used to create a variable field prescription 126 for items to be applied to individual agronomy zones. Part or all of this information can be extracted from the plot of land 144 to determine this field prescription 126. The field prescription 126 is the amount of at least one item, such as fertilizer 164, seed 166, pesticides 168, or other items, that is applied to the plot of land based upon the management zone profile 120 and soil sample analysis 124. Pesticides include all pest killing applications, such as insecticides, fungicides, herbicides, mitocides, rodenticides, and any other desired chemical product. Fertilizer includes, for example, manure, municipal waste, nutrient compositions, and other soil amendments, such as lime and gypsum. Nutrients that can be included in the nutrient compositions can include, for example, of nitrate nitrogen, ammonia nitrogen, copper, calcium, magnesium, manganese, iron, sodium, boron, phosphorous, potassium, sulfur, zinc, and chloride.

The field prescription 126 of these items can vary significantly between the agronomy zones. For example, an agronomy zone that exhibits low yield and low soil conductivity (Zone 6 in the twelve agronomy zone management zone profile) may require less fertilizer than a zone that exhibits high yield and high conductivity (Zone 10 in the same profile) because of the differential in removal of nutrients from the soil in the prior growing season.

The field prescription 126 is generated to accommodate these variances. Information related to the elevational profile 110, the satellite image profile 112, the soil conductivity profile 114, and the grower history profile 116, and yield potentials can also be used to determine the prescription 126.

A desired prescription for a particular agronomy zone can be determined using a formula that assesses the data collected from the soil sample or sample extracted from that zone. In formulating an agronomy zone prescription for an item, such as a nutrient, several factors can be considered. For example, the prescription of an item for an agronomy zone can consider residual levels of the nutrient, pH, residual levels of other nutrients, and a grower determined yield goal.

After determining the prescription for the individual agronomy zones, the prescribed amount of an item is applied to the plot of land 170, as the field prescription 126. Variable rate application devices can be used to accommodate the change in field prescription 126 associated with passing from one agronomy zone to another agronomy zone when traversing the plot of land. One example of a variable rate application system for the application of fertilizer upon a field is disclosed in U.S. Pat. No. Re. 35,100 (Monson and Bauer), incorporated herein by reference.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method for characterizing a plot of land, the method comprising the steps of:
    a) generating an elevation profile for the plot of land;
    b) generating a soil conductivity profile for the plot of land;
    c) generating a satellite image profile of the plot of land; and
    d) analyzing the elevation profile, the soil conductivity profile, and the satellite image profile to generate a management zone profile.

2. A method according to claim 1, further comprising the step of generating a grower history profile for the plot of land.

3. A method according to claim 1, wherein the management zone profile is divided into two or more agronomy zones.

4. A method according to claim 1, wherein the soil conductivity profile comprises data collected from a surface depth and a deep depth.

5. A method according to claim 1, wherein the management zone profile is divided into twelve agronomy zones.

6. A method according to claim 1, further comprising the step of dividing the plot of land into agronomy zones based upon the elevation profile, the soil conductivity profile, and the satellite image profile.

7. A method according to claim 3, further comprising the step of obtaining at least one soil sample from each of two or more agronomy zones.

8. A method according to claim 7, further comprising the step of analyzing the at least one soil sample obtained from each of the two or more agronomy zones.

9. A method according to claim 8, further comprising the step of creating a prescription of at least one item for the plot of land based upon the analysis of the at least one soil sample obtained from each of the two or more agronomy zones and the management zone profile.

10. A method according to claim 9, further comprising the step of applying the at least one item to the plot of land.

11. A method according to claim 9, wherein the at least one item is selected from the group consisting of fertilizer, seed, and pesticide.

12. A method according to claim 1, wherein the satellite image profile comprises a near infrared satellite image correlated to latitude and longitude for the plot of land.

13. A method for characterizing a plot of land, the method comprising the steps of:
    a) collecting elevational information on the plot of land;
    b) collecting soil conductivity information on the plot of land;
    c) collecting satellite imagery information on the plot of land;
    d) correlating the elevational information, the soil conductivity information, and the satellite imagery information to a latitude and longitude to produce an elevation profile, a soil conductivity profile, a satellite imagery profile, and a grower history profile; and
    e) providing the elevational profile, the soil conductivity profile, and the satellite imagery profile for analysis to generate a management zone profile.

14. A method for characterizing a plot of land, the method comprising the steps of:
    a) providing elevational information on the plot of land;
    b) providing soil conductivity information on the plot of land;
    c) providing infrared satellite imagery information on the plot of land;
    d) correlating the elevational information, the soil conductivity information, and the satellite imagery information to a latitude and longitude to produce an elevation profile, a soil conductivity profile, a satellite imagery profile, and a grower history profile; and
    e) providing the elevational profile, the soil conductivity profile, and the satellite imagery profile for analysis to generate a management zone profile.

15. A method for managing a plot of land, the method comprising the steps of:
    a) generating an elevation profile for the plot of land;
    b) generating a soil conductivity profile for the plot of land;
    c) generating an satellite image of the plot of land;
    d) analyzing the elevation profile, the soil conductivity profile, and the satellite image profile to generate a management zone profile, wherein the management zone profile is divided into two or more agronomy zones;
    e) obtaining at least one soil sample from each of two or more agronomy zones;

g) analyzing the at least one soil sample obtained from each of the two or more agronomy zones; and h) applying a prescribed amount of at least one item to the plot of land based upon based upon the analysis of the at least one soil sample obtained from each of the two or more agronomy zones and the management zone profile.

* * * * *